3,566,674
DEVICE FOR ANALYZING GAS MIXTURES BY A COMBINATION OF A CHROMATOGRAPHIC COLUMN AND A MASS SPECTROMETER

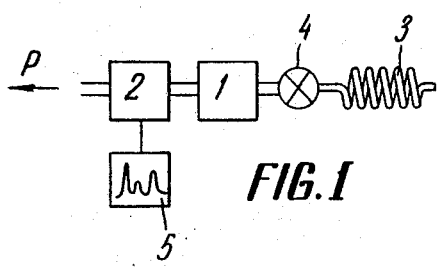
FIG.1
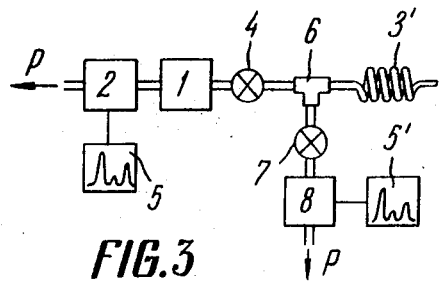
FIG.3
FIG.4
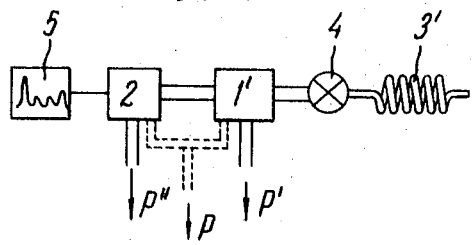
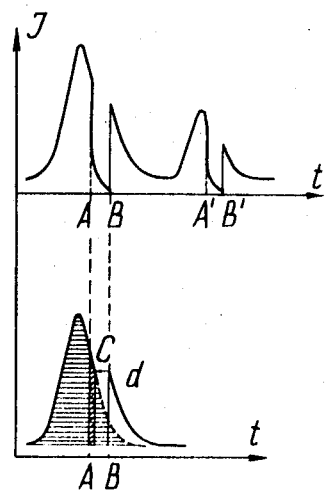
FIG.5
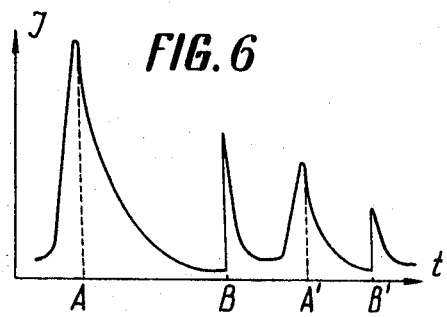
FIG.6

Viktor Lvovich Talroze, Vorobievskoe Shosse 11, kv. 21, and Vladimir Dmitrievich Grishin, Leninsky prospekt 57, kv. 161, both of Moscow, U.S.S.R.
Filed Nov. 29, 1967, Ser. No. 686,547
Int. Cl. G01n 31/08; H01j 39/34
U.S. Cl. 73—23.1                                    3 Claims

ABSTRACT OF THE DISCLOSURE

A device for analysis of gas mixtures comprises a chromatographic column connected to an effusion cell for determining the molecular weight of the mixture components, the effusion cell in turn being connected to a mass spectrometer with recording instruments, a valve being provided between the column and the cell for periodically closing communication therebetween during analysis. The output of the mass spectrometer during the periods of valve closure is integrated to provide data for the molecular weight determination.

---

This invention relates to devices for the qualitative and quantitative analysis of gas mixtures or mixtures of substances that can be gasified either preliminarily or directly at the inlet of the device.

At present, analyses of complex gas mixtures are carried out for the most part by means of gas chromatographs, the principal method of qualitative analysis in chromatography being the retention time technique. This technique, however, has a number of limitations, such as the necessity of calibrating the instrument with reference to the "suspected" compound, and also the fact that the process of interpreting the results is laborious and often inadequately reliable. It has, therefore, been suggested and is being practiced to employ detectors at the gas chromatograph outlet which are capable of not only detecting the substance that emerges from a chromatographic column and of quantitatively evaluating it, provided it has been preliminarily calibrated, but also of identifying the substance in question.

The mass spectrometer and gas-density meters are the most reliable detectors of this type.

To identify the substance on the basis of density measurements, the readings of a detector (Martin's gas-density meter) disposed at the chromatograph outlet indicate the difference between the density of the test gas mixture and that of the carrier gas.

The gas density meters suffer from the following drawbacks:

(a) determination of the molecular weight of components of the test mixture is feasible only when its quantitative composition is known or calls for incorporating into the sample a reference substance of a known molecular weight and rechromatographing the test mixture in the presence of various carrier gases;

(b) dependence of accurate molecular weight measurements and also of the measurable molecular weight range upon the molecular weights of mixture components and gas carriers;

(c) strict observance of standard experimental conditions (constant rate of carrier gas flow and constancy of the amount of the sample used). The gas-density meters are relatively insensitive since they involve the use of thermal-conductivity cells as detectors, and, therefore, find no application in conjunction with capillary chromatographic columns having a low rate of sample flow.

The gas-density meters determine the density of a gas and, hence, its molecular weight. The molecular weight lends itself to determination by other techniques, e.g., by the effusion method which makes use of the fact that the rate of efflux of a gas from a confined volume designated as the effusion cell or Knudsen cell under the Knudsen flow conditions, i.e., where the free path of molecules is greater than the diameter of the orifice through which the gas effuses, will be inversely proportional to the square root of the molecular weight. The molecular weight of the gas can be determined by measuring in some way the dependence of pressure in the effusion cell upon time. The effusion method, however, is suitable for measuring with adequate accuracy the molecular weight of gases only where the effusion cell contains one or two substances, or if the instrument used is sensitive exclusively to the component of interest.

For example, the latter situation was realized by employing the effusion method in conjunction with the mass-spectrometric technique.

Known are the following devices for gas mixture analysis which comprise a chromatographic column and a vacuum-type detector insensitive to the carrier gas, such as a mass spectrometer, the chromatographic column and mass spectrometer being intended for the identification of test compounds in the chromatographic peak by the mass spectrometric technique:

(1) A part of the gas stream leaving chromatograph is passed through a single-beam mass spectrometer, while the other part of the gas stream comes to a chromatographic detector (katharometer or ionization detector). The ratio of signals from the mass spectrometer and chromatographic detector defines the compound of the chromatographic peak. However, the above device calls for frequent preliminary calibration since both the mass spectrometer and chromatographic detectors are devoid of an adequate long-term stability of absolute sensitivity.

(2) A part of the gas stream emerging from the chromatograph is continuously pumped through a quick-acting time-of-flight mass spectroscope or some other mass spectroscope type. During chromatographic peak passage, the entire mass spectrum of the substance or a substantial portion thereof is recorded rapidly. This arrangement necessitates the employment of comparatively elaborate equipment and is of relatively low sensitivity. In this case the mass spectrum serves to identify the substance in the chromatographic peak only, while the quantitative determination of the substance in the test mixture is effected by means of conventional chromatographic detectors or by the provision of additional collectors in the mass spectrometer, onto which collectors an unseparated ion stream is directed from the ion source of the mass spectrometer.

(3) The entire gas stream leaving the chromatograph is directed to a dual-collector mass spectrometer adjusted with reference to two mass spectrum lines that are common to all the compounds in the test mixture, or with reference to two groups of mass spectrum lines, the ratio of the intensities of these lines or groups of lines making it possible to identify the compounds, while the areas of chromatographic peaks traced by ionic currents of each line or group of lines are useful for the quantitative estimation of the compounds of interest. The latter device is superior to that described earlier as far as simplicity and sensitivity are concerned, but is inferior to it as regards the feasibility of identifying the substances whose mass spectra have not been established with an adequate degree of accuracy. The device is likewise incapable of determining the molecular weight of a compound whose "name" has not been preliminarily ascertained.

In many respects, the mass spectrometer is an ideal chromatographic detector, but its employment necessitates that the mass spectrum of the "suspected" compound be known at least approximately, or stipulates that there exists confidence as to the fact that the heaviest ion observed in the mass spectrum is an undissociated molecular ion. High degree of dissociation experienced by many substances while being ionized in the course of mass spectrometric analysis, makes the detection of an undissociated molecular ion an unreliable operation, whereas the sensitivity of the device in to-to, becomes low, provided it is pertinent to employ an undissociated molecular ion in mass spectrometry.

It is a primary object of the present invention to provide a device for the analysis of gas mixtures that will make it possible to carry out simple and reliable identification of a compound in a chromatographic peak.

It is a further object of the present invention to provide a device for the analysis of gas mixtures that will render it possible to analyze quantitatively a gas mixture on the basis of data obtained by identifying the compound in the chromatographic peak.

It is an additional object of the present invention to provide a device for the analysis of gas mixtures that will ensure high stability of retention times of the components of test mixture so that, apart from molecular weight determinations, the device will be useful for identifying the compounds of interest by the conventional chromatographic technique.

It is a still further object of the present invention to provide a device for the analysis of gas mixtures that will be noted for its high accuracy and sensitivity as a means of rapid qualitative and quantitative analysis of complex mixtures of gases and will involve a minimum number of calibrations.

With these and other objects in view, in the device for the analysis of gas mixtures, which comprises a chromatographic column and a vacuum detector that is insensitive to the carrier gas, e.g., a mass spectrometer, there is provided, according to the invention, an effusion cell for determining the components of a gas mixture on the basis of molecular weight measurements, the inlet orifice of which cell communicates with the outlet of the chromatagraphic column via a valve intended for closing the inlet orifice of the effusion cell, provision being made in the cell for at least one outlet orifice for the efflux of gas mixture components which communicates with the inlet orifice of the vacuum detector, the size of outlet orifices of the effusion cell and detector through which there takes place the efflux of gas mixture components being selected so that, with the valve closed, the efflux of gas mixture components would obey Knudsen flow conditions.

Where use is made of packed chromatographic columns, it is expedient to incorporate a gas mixture stream splitter between the chromatographic column and the valve, provision being made in the splitter for an auxiliary valve that should be closed and opened simultaneously with the principal valve.

When use is made of packed chromatographic columns, the effusion cell may be furnished with at least one auxiliary orifice for the efflux of gas mixture components which is connected to a vacuum pump, the size of the orifice being selected so as to obtain, with the valve closed, the Knudsen flow conditions.

These features of the construction of the present device provide for the following advantages:

(1) qualitative analysis of mixtures of gases or liquids in one and the same device by determining accurately the molecular weight of the components being analyzed and concomitant quantitative estimation of the relative proportion of the components in the test mixture;

(2) identification of the components of the test mixture by carrying out in one and the same device both molecular weight determinations and identification by other techniques, e.g., chromatographic identification by the retention time method;

(3) infrequent calibration of the device with reference to "pure" substances, and (4) simplicity of manufacture and upkeep of the device.

Other objects and advantages of the present invention will become apparent upon consideration of the description of specific embodiments thereof and from the accompanying drawings, wherein:

FIG. 1 presents a block diagram of the device, according to the invention;

FIG. 3 is a block diagram of another modification of the device, according to the invention;

FIG. 4 is a block diagram of a third modification of the device, according to the invention;

Figure 7:
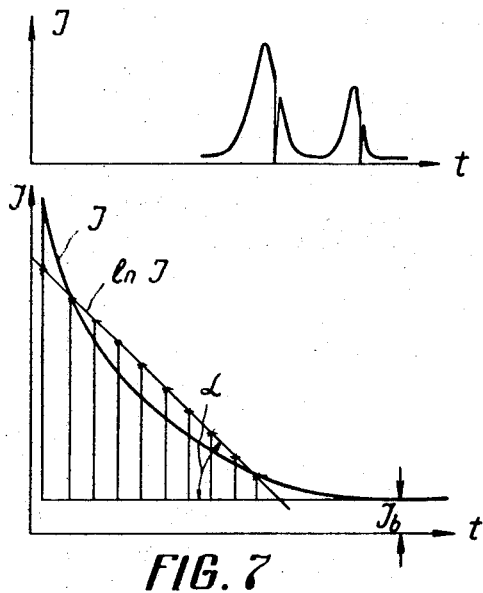
Figure 8:
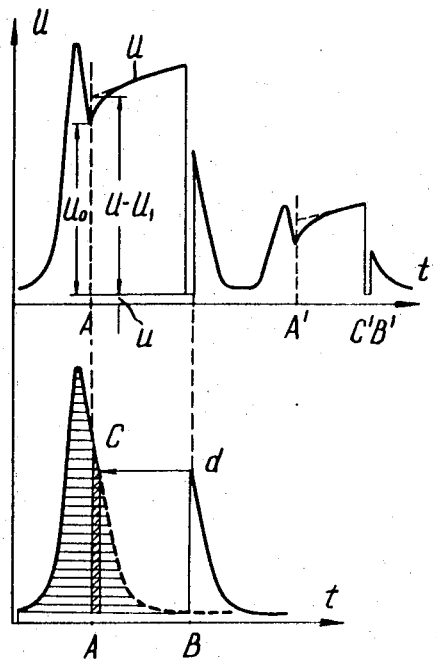
Figure 11:
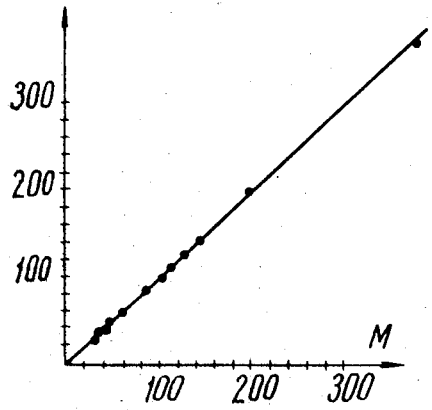
Figure 12:
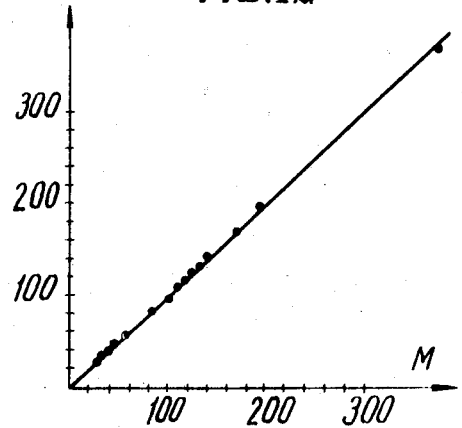
Figure 9:
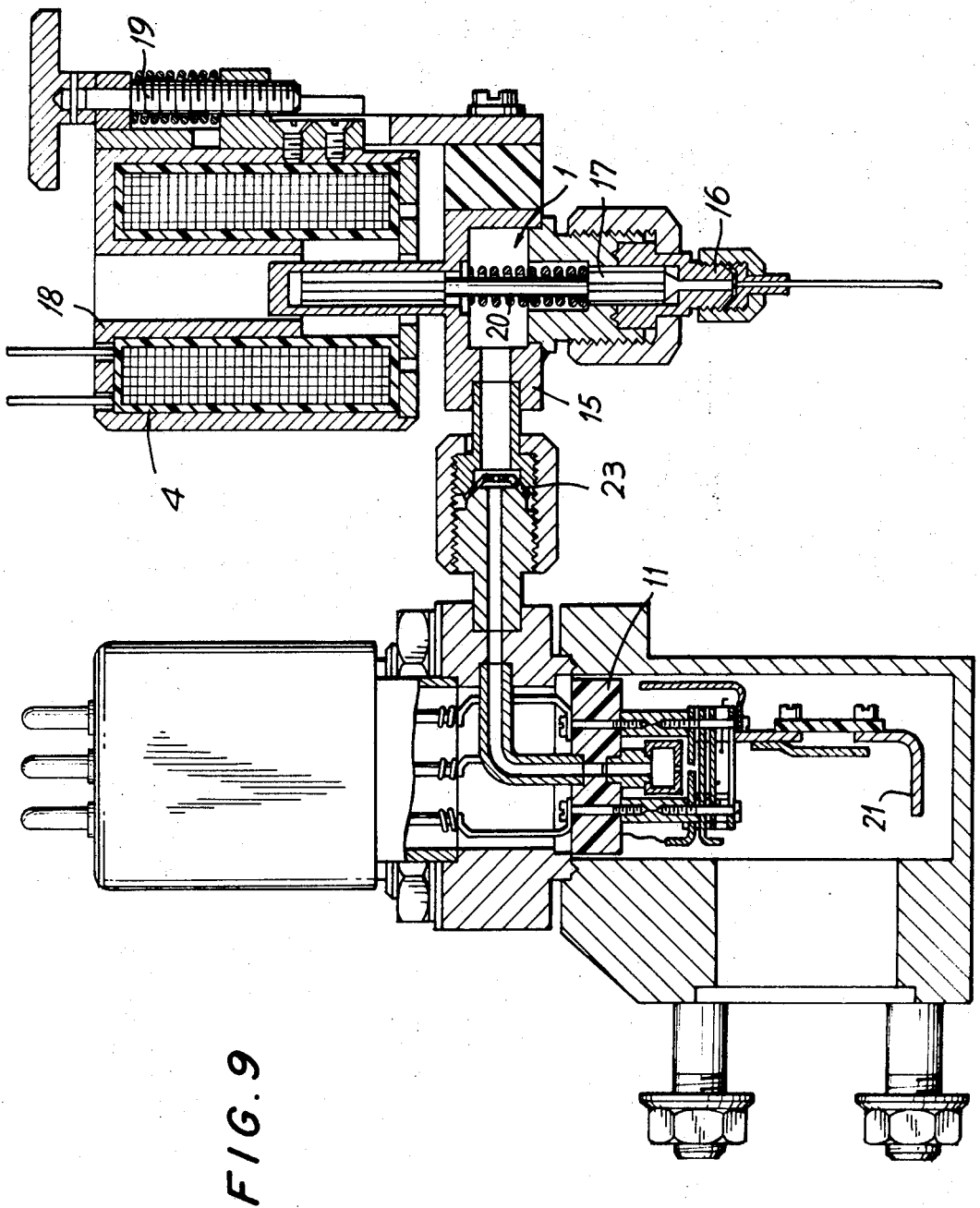
Figure 10:
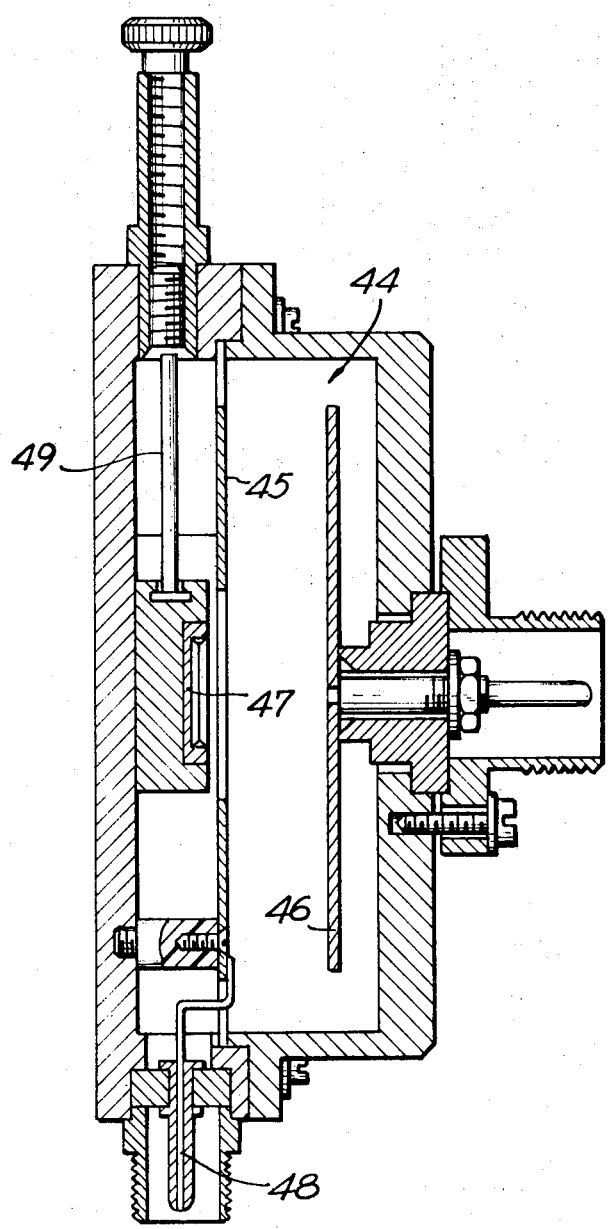

FIG. 5 presents a simplified record of a part of the chromatogram obtained with the help of the present device;

FIG. 6 presents a simplified record of a part of the chromatogram obtained by the accelerated time-base technique in the effusion analysis assembly of the present device;

FIG. 7 is a simplified record of a part of the chromatogram and effusiogram obtained by means of the present device;

FIG. 8 is a simplified record of a part of the chromatogram obtained by the integration technique on the present device;

FIG. 9 is a cross-sectional view of an effusion cell, a valve and a mass spectrometer chamber with ion source of the present device;

FIG. 10 presents the ionization chamber of the present device;

FIG. 11 is a graph of molecular weight measurement data by the integration technique obtained by means of the device, according to the present invention; and FIG. 12 is a graph of molecular weight measurement data by the differential technique obtained by means of the device, according to the present invention.

The device according to the invention, comprises an effusion cell 1 (FIGS. 1 and 2), a vacuum detector 2 connected to a pump (as indicated by the arrow P), a chromatographic column 3, a valve 4, and a recording instrument 5.

The second modification of the present device (FIG. 3) is distinct from the first modification (FIG. 1) in that imposed between chromatographic column 3' and valve 4 are a stream splitter 6, an auxiliary valve 7 and a chromatographic detector 8 connected to a vacuum pump (as indicated by the arrow P') and a recording instrument 5'.

The third modification (FIG. 4) is distinct from the first and second modifications in that an effusion cell 1' apart from an outlet orifice through which there effuse into vacuum detector 2 gas mixture components, is furnished with an additional orifice for the effusion of gas mixture components that is connected to a vacuum pump (as indicated by the arrow P''), the size of said additional orifice being selected so as to provide the Knudsen flow conditions.

The effusion of the test gas through the additional orifice is the critical factor both during chromatogram tracing and in the course of effusiometric curve recording.

One of the two pumps indicated by the arrows P' and P'' may be dispensed with, provided the capacity of the other pump is adequate, as shown in FIG. 4 by a dotted line.

The device, according to the invention, operates on the following principle.

The entire gas stream leaving column 3 passes through effusion cell 1 and detector 2. While the components to be separated are still traversing column 3, valve 4 disposed at the inlet side of effusion cell 1 is open. Once a mixture component reaches effusion cell 1 and detector 2, valve 2 is closed abruptly, so that a part of the component of interest will remain in the cell. Then the component together with the carrier gas continues to flow from effusion cell 1 into detector 2 in such a way that, provided the pressure in the detector is constantly much below that in the cell thanks to detector evacuation, the concentration N of the component in the effusion cell will diminish exponentially according to the following law:

$$N = N_0 \exp\left(-\frac{a}{v}\sqrt{\frac{T}{M}}\, t\right) \quad (1)$$

where:

$N_0$ is the concentration during closing the valve;
$t$ is the time that has elapsed after closing the valve;
T stands for the absolute temperature of the gas in the effusion cell;
M is the molecular weight;
V is the cell volume, and
$a$ is a constant, which is proportional, in the simplest case, to the cross-sectional area of the outlet orifice.

The efflux of the carrier gas obeys the same law, but, naturally, with another value of M, the carrier gas being selected so that detector 2 is insensitive to it and the presence of the carrier gas does not interfere with the determination of the component of interest.

The conditions of gas flow are chosen so as to provide gas efflux from the volume of effusion cell 1 in accordance with the Knudsen flow conditions. In this case, if the pressure in effusion cell 1 is much greater than that in detector 2, the pressure within the detector will, in turn, exceed substantially that behind the detector, and if the detector signal, T is proportional to the partial pressure of the test substance in the detector, then the signal in question will be proportional to the concentration of the substance in the effusion cell $$T = a \times b \times N \quad (2)$$

where $b$ is a proportionality factor, which depends upon the properties of the test substance and the sensitivity of the detector, but remains constant at a constant volumetric rate of detector evacuation. Then T equals $$T = T_0 \exp\left(-\frac{a}{V}\sqrt{\frac{T}{M}}\, t\right) \quad (3)$$

where $T_0$ is the magnitude of the signal during valve closing, $a$ is a constant of the device, and $$\tau = \frac{V}{a}\sqrt{\frac{M}{T}} \quad (4)$$

is the efflux time constant for the substance M.

The determination of M consists in analyzing the dependence given by the Equation 3, the calibration factor being the reduced value of the time constant $\tau_0$ (efflux time constant at M=1)

$$\tau_0 = \frac{V}{a\sqrt{T}} \quad (5)$$

which can be determined by plotting the curve of the dependence (3) for the chromatographic maximum of a substance, for which M is known.

The manual analysis of the curve of the dependence (3) is performed in the usual manner by taking logarithms and determining the value of $\sqrt{M}$ from $\ln\alpha$, the slope of the curve $\ln T = (t)$. Hence, the vaue of M for an unknown compound shall be determined from the formula $$M = \left(\frac{1}{\tau_0 \ln\alpha}\right)^2 \quad (6)$$

The curve of the dependence (3) having been plotted, valve 4 interposed between column 3 and effusion cell 1 should be opened and there sets up a steady-state flow of the carrier gas. The as yet unrecorded portion of the chromatographic peak enters detector 2 and is recorded by recording instrument 5. The present device functions in a similar manner upon the arrival of subsequent chromatographic peaks, either all or as selected by the operator.

The design of the present device has made it possible to sidestep a substantial diminution of the separation capacity of the chromatograph which owes its origin to two causes.

To begin with, the separation capacity experiences a diminution due to a finite value of the volume V of effusion cell 1. In the present device, the effusion cell volume is selected so that the cell accommodates but a small portion of the chromatgrophic peak.

Secondly, the separation capacity drops thanks to the fact that closing of valve 4 causes the gas stream in column 3 to stop, so that the stream volume containing the chromatographic peak portion that has not entered effusion cell 1 undergoes contraction towards valve 4. In the thus arrested stream there ceases chromatographic separation, although the peaks continue to be diffusively blurred. In order to prevent the diffusion-type blurring of the peaks from becoming excessively pronounced during the total duration of all stream discontinuations, it is pertinent to make the efflux time constant of the effusion cell adequately small. Since diminution of the cell volume V, also results in decreasing the value of $\tau_0$, both causes of the decreased separation capacity lend themselves to rectification by essentially one and the same way. However, the lower limit of diminishing the magnitude of $\tau_0$ is restricted by the time constant of detector 2, amplifying channel and recording instrument 5. It has been found that, in view of the above limitation it is sufficient to have $\tau_0 \geqslant \tau_n$, where $\tau_n$ is a sum of time constants of detector, amplification duct and recording instrument (in our experiments, we have used $\tau_0 \geqslant 0.3$ to $0.5$ sec.). As pointed out later, the effusiometric curve should preferably be plotted within a period of several $\tau$, so that the effusiometric analysis of a 10-component mixture having a molecular weight of $\sim 10^2$ would require $2-3 \times 10^2$ sec. To carry out the chromatographic analysis of a complex mixture, usually takes $10^3$–$10^4$ sec., during which period, as has been ascertained experimentally, peak blurring in column 3 is negligibly small. It should also be borne in mind that the necessity of determining the molecular weights of all components of the mixture being analyzed seldom arises in the course of one experiment. Hence, the second cause of separation capacity diminution is eliminable.

Shown schematically in FIG. 5 (top) is a part of the chromatogram recorded by means of the present device, wherein the time ($t$) is plotted on the abscissa and detector signals ($\tau$), on the ordinate. The chromatograph presents two consecutive peaks. Points A and A' correspond to closing of valve 4 of effusion cell 1, while points B and B' denote valve opening. In each of the three modifications of the present device, provision is made for three different operating modes, viz:

The operator sends a signal to close or open valve 4;

The operator sends a signal to close the valve, while a signal to open the valve is sent automatically by means of a timer which is actuated after a pre-set time has elapsed since valve closing;

A signal to close the valve is also sent automatically, once the reading of detector 2 reaches a definite mark on the scale of recording instrument 5 either on the ascending or the descending slope of the chromatographic peak.

Molecular weight is determined from portions AB and A'B' of the curves. In order to increase the precison of subsequent treatment of the results obtained, on curve portions AB and A'B' it is expedient to resort to one of the following techniques:

(a) to accelerate scanning;
(b) to connect automatically second recording instrument 9 (FIG. 2) having a greater scanning rate, or
(c) to connect automatically a quick-acting digital-scale voltmeter.

Which of the three techniques disclosed hereinabove will be selected by future manufacturers of the present device, would depend upon the availability and price of appropriate recording instruments.

Modifications (b) and (c) stipulate that at curve portions AB and A'B' scanning by chromatogram recording instrument 5 be stopped and the instrument be cut off. FIG. 6 illustrates a simplified record of the chromatogram obtained in accordance with the modification (a), while the schematic chromatogram records of instrument 5 resulting from the use of modifications (b) and (c) are shown in FIG. 7 (top). Plotted on the abscissa is the time (t), and on the ordinate, the detector signal $\tau$. The bottom part of FIG. 7 shows a schematic record of a signal portion AB by recording instrument 9 and also the logarithmic curve of said portion corrected for background signal. The molecular weight is determined in the same manner as indicated previously with reference to Equation 6.

In order to improve the accuracy of data processing, it is expedient to allow signal attenuation along portion AB until it reaches practically the background level. It is, therefore, assumed that portion AB shall correspond to $3\tau$ or more. As can be seen from relevant figures, the chromatogram obtained in acordance with the modifications (b) and (c) is more readily visualized. The presence of a constant (or very slowly varying) background of the detector $T_B$, as well as the presence of an admixture in the carrier gas results in obtaining the following expression for the detector signal $$T = T_0 e^{-\frac{t}{\tau\sqrt{M}}} + T_{10} e^{-\frac{t}{\tau_0\sqrt{M_1}}} + T_b \quad (3')$$

where $T_{10}$ is the signal value of an admixture having molecular weight M, at the moment of the valve closing.

Where the carrier gas contains an impurity that is recorded by detector 2 and is present in a concentration comparable with that of the component being analyzed, affects the accuracy of the effusiometric analysis. To obtain the accuracy, typical of the proposed apparatus (2–3%), for determining the molecular weight of the mixture component, it is sufficient that the content in the carrier gas of an admixture of any molecular weight be less than 1% of the peak content in the carrier gas of the mixture component whose molecular weight is being determined. However, for the majority of actually encountered admixtures this requirement can be still less categoric. For instance, if the molecular weight of the admixture is double that of the mixture component it is permissible to have a 10% content instead of the above 1% content. With a view to improve the accuracy of determining the molecular weight of the component in the presence of an admixture in the carrier gas and also to diminish the time required for measurement data processing, the present invention stipulates that an integrator be incorporated in the amplifying channel. When the device is operated under effusiometric conditions, the integrator signal $$S = \int T dt$$

after a period of time $t \gg$ 5–6 $\tau$ will be expressed with a sufficient degree of accuracy in the following form:

$$S = T'_0 \tau_0 \sqrt{M} + T'_{10} \tau_0 \sqrt{M_1} + T_b t \quad (7)$$

where $T_0$ is the instantaneous value of the component signal at integration commencement, $T'_{10}$ is the instantaneous value at integration commencement, of the signal due to a probable admixture having a molecular weight of $M_1$ and contained in the carrier gas and $T_b$ is the instantaneous value of the detector background signal, the signals due to all very heavy admixtures in the carrier gas being also included in said background signal.

After a pre-set period of time, which should invariably be constant for a given series of experiments, the integrator should be switched on simultaneously with or somewhat later than closing of the valve 4.

The integral becomes after a period of time of several $\tau$, as it follows from the Equation 7, a practically linear function, so that the graph of $T = f(t)$ becomes a straight line, which, upon being extrapolated to the moment of integration commencement, yields the value of $$\Sigma = T'_0 \tau_0 \sqrt{M} + T'_{10} \tau_0 \sqrt{M_1} \quad (8)$$

The fact that the admixture concentration in the carrier gas is generally quite stable, enables the operator, by measuring the value of $T'_{10} \tau \sqrt{M_1}$ and $T'_{10}$ in the interval between chromatographic peaks of chromatograms, to determine subsequently the value of $T_0 \tau_0 \sqrt{M}$ for any chromatographic peak by subtracting $T'_{10} \tau \sqrt{M_1}$ from $\Sigma$, and also to calculate the value of $T'_{10}$ by subtracting the components $T'_{10}$ and $T_b$ from the instantaneous value of the signal $T_0$ at the initial point of every integration $$T'_0 = T_0 - T'_{10} - T_b \quad (9)$$

The value of $\tau_0$ is determined from the chromatographic peak of the test substance (or from peaks obtained by chromatographing a plurality of substances) of the known M. The value of M for an unknown compound may be calculated by the following formula $$M = \left[ \frac{\Sigma - T'_{10} \tau_0 \sqrt{M_1}}{\tau_0 (T_0 - T'_{10} - T_e)} \right]$$

Figure 2:
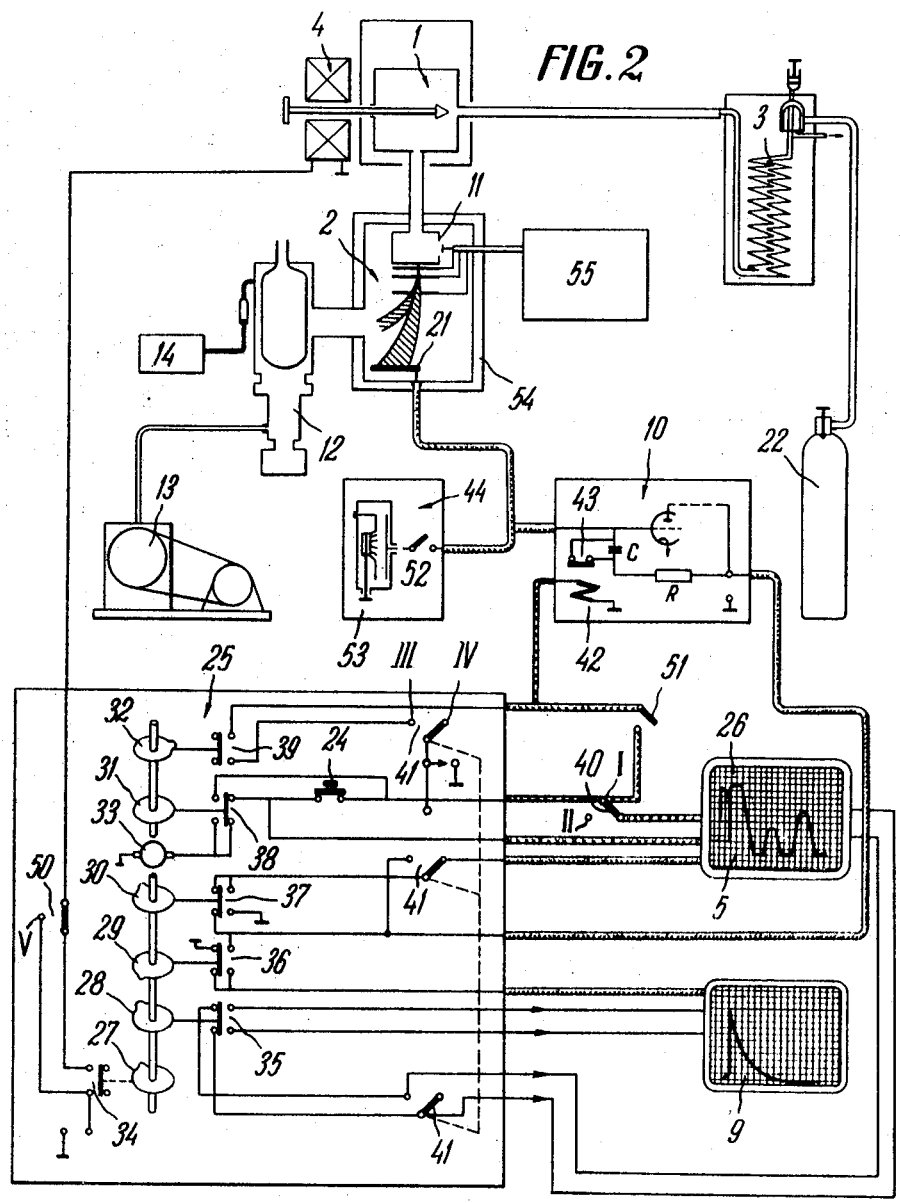
FIG. 2 is a detailed diagram of the device shown in FIG. 1.

In the present device, integration is effected by a combination of a resistance-capacitance network and negative feedback D.C. amplifier 10 (FIG. 2) available in the device, the input resistance of said amplifier being employed as the resistance element R of the network and the capacitance C being interposed between the control grid and the input resistance of the amplifier (the arrangement of elements in the resistance-capacitance network of D.C. amplifier 10 is shown in FIG. 2).

Using such a combination for the detector signal, as described by the expression (3), produces on the RC-chain, and, consequently, on the amplifier output, the following signal:

$$U = T_b R + \frac{T_g t}{C} + \frac{T'_0 t}{C} + \frac{T'_0}{C}(RC - \tau)e^{-\frac{t}{\tau}} + \frac{T'_{10} \tau_1}{C}$$
$$+ \frac{T'_{10}}{C}(RC - \tau)e^{-\frac{t}{\tau}} \quad (11)$$

$\tau_1$ is the time constant of effusion of an admixture present in the carrier gas.

Analysis of the Equation 11 indicates that the signal of this type of integrator at small values of $t$ is in fact no integral of the ion current signal, but becomes an integral only at adequate large values of $t$.

For $t \gg \tau$ and $t \gg \tau_1$, $$U = T_b R + \frac{1}{C}(T_1 t + T'_0 \tau + T'_{10} \tau_1) \quad (12)$$

so that U becomes a linear function of $t$ whose graphical extrapolation to the moment of switching on the integrator yields:

$$U = T_b R + \frac{1}{C}(T'_0 \tau + T'_{10} \tau_1) \quad (13)$$

The term $T_b R$ is potential difference $U_b$ developed by the detector background current across the input resistor of the amplifier when the integrator is inoperative:

A comparison of the expressions 13 and (4, 5, 8) yields $$U - U_b = \frac{\Sigma}{C} \quad (14)$$

Similarly, integration over the interval between chromatographic peaks or chromatograms yields, when recourse is had to the same procedure, the difference $$(U - U_b)' = \frac{T'_{10} \tau_0 \sqrt{M_1}}{C} = \frac{T'_{10} \tau_1}{C} \quad (15)$$

On the other hand, the instantaneous value of the potential difference across the input resistor when there commences integration will be $$U_0 = (T_b + T_0' + T_{10}'')R \qquad (16)$$

whereas the potential difference that arises due to the admixture current equals $$U_{10} = T_{10}'R \qquad (17)$$

It follows from the Equations 14–17 and 10 that $$M = \left(\frac{RC}{\tau_0}\right)^2 \cdot \left[\frac{(U-U_b)-(U-U_b)'}{U_0-U_{10}-U_b}\right]^2 \qquad (18)$$

Hence, the term $$\left(\frac{RC}{\tau_0}\right)^2$$

serves as a constant calibration coefficient in the integration method of molecular weight determination. The shape of chromatograms, obtained when use is made of the integrator, is illustrated in FIG. 8 (top). Plotted on the abscissa is the time ($t$), and on the ordinate, the detector signal ($U$). Shown in FIG. 8 are two consecutive chromatographic peaks. In points A and A', valve 4 of effusion cell 1 is closed and the integrator is switched on, while on reaching points C and C' the integrator is disconnected. In points B and B', valve 4 of effusion cell 1 is opened.

The chromatogram of the above identified shape appears when the effusion time constant $\tau$, of the component being analyzed is greater than the time constant RC of the integrator, while the concentration of the component of interest exceeds that of the admixture. The validity of these conditions stems from the analysis of the Equation 11.

Provided the above requirements are observed, on the chromatogram (see FIG. 8) there appears a clearly discernible break which is indicative of integration commencement and is, therefore, instrumental in suppressing substantially the errors inherent in graphical U. measurements.

It is envisaged to incorporate in the present device a versatile detector of the following type:

(a) A mass spectrometer continuously adjusted with reference to a mass spectrum peak or a group of peaks devoid of peaks due to the carrier gas.

(b) In the most advanced modification, it is expedient to make use of an arrangement that renders possible, if desired so by the operator, to rapidly plot the entire mass spectrum of the component that effluxes from effusion cell 1. It is to be noted that employment of the above arrangement is conducive to a much more precise interpretation of the mass spectrum than it has heretofore been feasible in the known chromatographic mass spectrometers with rapid mass spectrum recording, the improved precision of mass spectrum interpretation being due to the fact that the law that governs pressure attenuation of the component in the ion source of the mass spectrometer is exactly known for the portion AB, so that into the height of each mass spectrum peak there might be introduced an exact correction $$L = e^{\frac{t_n}{\tau}} \qquad (19)$$

where $t_n$ denotes the time of recording the $n$th mass spectrum peak that has elapsed since the moment of the emergence of the first peak.

(c) In the cheapest and simplest modification of the present device, it is envisaged to employ a detector which comprises a mass spectrometer in which provision is made for an ion collector characterized in that the bulk of test mixture component ions continuously impinges upon said collector, while ions of the carrier gas miss it.

Vacuum detectors to be used in conjunction with specific embodiments of the present invention are, as a rule, rated to accommodate relative small mass flows of a test gas that are essentially typical of capillary chromatographic column. Where recourse is had to packed columns noted for their higher capacity, it is envisaged to employ the second and third modifications of the present device.

The second modification of the present device operates on the principle that is basically similar to that employed in the first modification.

However, as distinct from the first modification, the bulk of the gas stream leaving packed chromatographic column 31 (FIG. 3) does not enter effusion cell 1, but is either discarded or passed through conventional chromatographic detector 8, which serves in this case as a means of quantitative analysis. When this modification of the device is to be used for performing the effusiometric analysis, valves 4 and 7 should be closed simultaneously.

The third modification of the present device likewise operates on the principle that is analogous to that disclosed with reference to the first modification.

A more detailed diagram of the present device is shown in FIG. 2.

Effusion cell 1, valve 4 and the mass spectrometer chamber with an ion source are shown schematically in FIG. 9 (in the device under consideration, effusion cell 1 and valve 4 are designed so as to constitute one assembly).

In the description that follows reference is made simultaneously to both figures specified above.

A gas stream from chromatographic column 3 passes via valve 4 and effusion cell 1 into an ion source 11 (FIG. 9) while being pumped out by a pumpdown system made up of a diffusion pump 12 with a cold trap and a force pump 13 with appropriate lines. To measure the pressure in the mass spectrometer chamber and also the force pressure, use is made of a composite ionization-thermocouple vacuum gauge 14.

The rate of gas flow is controlled by valve 4, the gas flow rate being equal in capillary columns to 0.2–0.3 cm.$^3$/min. under standard operating conditions.

Valve 4 consists of a body 15 (FIG. 9), which also serves as the case of effusion cell 1, a seat 16, and a needle 17, the needle being simultaneously used as the core of an externally disposed magnet 18. With magnet 18 energized, the magnetic core will always be maintained in strictly one and the same position with reference to other components of the magnetic circuit. When magnet 18 is energized, the gas flow rate lends itself to control by displacing the magnet with needle 17 in relation to seat 16 by a micrometer screw 19.

Once magnet 18 is deenergized, a spring 20 causes needle 17 to sink into seat 16, thereby closing valve 4.

The overwhelming majority of ions produced in ion source 11 (ions whose mass number exceeds 12$e$), except for carrier gas ions, are collected on a collector 21 (FIG. 2). It has been found that in order to diminish the detector noise it is often advantageous to use the collector for collecting the ions having a mass number greater than 30$e$, so as to dispense with the background current due to the ions of $H_2O$, air and CO. The carrier gas used is hydrogen or helium fed from cylinder 22. To measure the ion current, use is made of D.C. amplifier 10 and an automatic potentiometer 5 operated at a low chart travel rate of 5–20 mm./min.

While the chromatographic peak is passing through effusion cell 1 and detector 2, the operator should deenergize magnet 18 of valve 4 and thus close valve 4, thereby interrupting the flow of the gas from chromatographic column 3 to effusion cell 1. The compound in the chromatographic peak that has partly been trapped in the effusion cell flows via one or several orifices in a diaphragm 23 (FIG. 9) into detector 2, which measures the rate of efflux of the compound from effusion cell 1 (the volume of the effusion cell and the size of orifices depend upon the time constant, $\tau_0$, selected).

The operator closes valve 4 either manually by means of a push button 24 (FIG. 2) or automatically through the agency of contacts 26 of a programmer 25, the contacts being adjusted at the height of the selected signal amplified and closed by a recorder pen.

Programmer 25 comprises a plurality of shaped cams 27–32 set in rotation by a synchronous motor 33, the cams being instrumental in closing contacts 34–39 according to the pre-set program. The design of programmer 25 enables the operator to switch over from automatic to manual operation and vice versa by means of a switch 40.

(a) Automatic operation

To measure automatically the molecular weights of all components of the test mixture, switch 40 should be set in position I.

(b) Manual operation

To determine the molecular weight of one or several components of the test mixture, the operator should set switch 40 in position II and depress push button 24 while the selected peak passes through effusion cell 1 and detector 2.

Both automatic and manual molecular weight determinations can be effected either by the differential or the integration technique, the desired technique being selected by means of switch 41.

Presented hereinbelow is the sequence of operations to be performed by the operator and programmer 25 in the course of molecular weight determination.

Molecular Weight Determination by Integration Technique Switch 41 should be set by the operator in position IV.

(a) Automatic operation

Switch 40 of programmer 25 should be set in position I.

While the chromatographic peak is passing through effusion cell 1 and detector 2, the recorder pen makes contacts 26, thereby energizing motor 33 of programmer 25. Cam 27 makes contacts 34 and valve 4 is closed, so that the gas flow from chromatographic column 3 to effusion cell 1 is arrested. Cam 32 makes contacts 39 at once or after a pre-set period of time (depending upon the shape of the cam selected by the operator). Actuation of relay 42 causes contacts 43 to break and short-circuit the capacitance C of the integrating circuit of D.C. amplifier 10. Detector 2 sends a signal to the integrating resistance-capacitance circuit, whereupon the signal is amplified by amplifier 10 and the chromatogram-tracing recorder of recording instrument 5 commences to record the integration curve. Integration time depends upon the shape of cam 32 selected. Integration having been completed, contacts 39 break and relay 42 is deenergized, thereby breaking contacts 43 and causing the recorder of instrument 5 to record the background level of detector 2. Within 2–3 seconds, as set by the shape of cam 27 used, valve 4 opens and the recorder of instrument 5 continues chromatogram tracing. Cam 31 with contacts 38 is intended for resetting programmer 25.

The signal component due to the presence of an admixture in the carrier gas is measured by the operator in the interval between chromatographic peaks or chromatograms by depressing push button 24, said signal component being important where the molecular weight is to be determined from the Equation 18.

(b) Manual operation

Switch 40 of programmer 25 is set in position II. While the chromatographic peak passes through effusion cell 1 and detector 2, the operator depresses push button 24, thereby energizing motor 33 of programmer 25. The device functions further as described earlier for measurements with the switch in position I.

Molecular weight determination by differential technique

The operator should place switch 41 in position IV.

(a) Automatic operation

Switch 40 of programmer 25 should be set in position I.

At the moment when the maximum of chromatographic peak is passing through the effusion cell 1 and detector 2, the recording pen of instrument 5 closes contacts 26. During the closing of the contacts 26, the motor 33 of programmer 25 is energized, cam 27 closes contacts 34, and valve 4 is closed, thereby cutting off the gas stream from the chromatographic column 3 into the effusion cell 1. The cam 30 opens contacts 37, disconnecting the recorder input of instrument 5 at a low speed of the tape drawing from D-C amplifier 10, and short-circuits it. The cam 29 closes contacts 36, connecting thereby the input of recorder 9 at an accelerated speed of rewinding the tape to the D-C amplifier 10. The cam 28, throwing over the contacts 35, stops the motor of the recorder of instrument 9. The time of recording the effusion rate of a component from the effusion cell 1 on the recorder of instrument 9 is preset by the profile of cams. On completing the measurement of molecular weight, the cams return the contacts 34, 35, 36, 37 and 39 in their initial position; valve 4 is opened, and the recorder of instrument 5 continues the further recording of the chromatogram. The cam 31 together with contacts 38 resets the programmer 25 in its initial position.

(b) Manual operation

Switch 40 of programmer 25 is set into position II. At the moment when the maximum of chromatographic peak is passing through effusion cell 1 and detector 2, operator depresses push button 24 energizing the motor 33 of programmer 25, and thereafter the device functions in the same manner as disclosed earlier with reference to measurements when switch 40 is in position I. When the component concentration is low, the share of the background current in the integral value becomes relatively significant and renders measurements difficult. In order to compensate for the background of detector 2, it is expedient to employ a saturation ionization chamber 44 (FIG. 10) that is continuously irradiated by a radioactive source.

In parallel-plate ionization chamber 44 provision is made for two cylindrical electrodes 45 and 46. Radiation emitted by a source 47 (20 mCi Promethium-147 beta-source) enters ionization chamber 44 via a wire gauze port in electrode 45. Electrode 46 functions as an electron and negative ion collector. Negative potential from a 400-v. power pack (not shown in the drawings) is supplied to electrode 45 via a plug 48. The current in chamber 44 depends upon the dosage rate in the space between electrodes 45 and 46 and lends itself to variation within a wide range by displacing source 47 along the port of electrode 45 by means of a micrometer screw 49. The ionization chamber contains dry air (or any other gas) at the atmospheric pressure.

Compensation of the background current of detector 2 by the current of ionization chamber 44 is adjusted during the interval between chromatograms or chromatographic peaks in the following sequence. A switch 50 (FIG. 2) is set in position V so that valve 4 is closed. Next a switch 51 is closed to set the device for operation under integrating conditions.

Switch 52 connects ionization chamber 44, while knob 53 is used to adjust in ionization chamber 44 the current that compensates the growth of the integral due to the second term in the right-hand part of Equation 11, i.e., brings the inclined linear portion of the integration curve in the horizontal position, as shown in FIG. 8. Then switches 50 and 51 are returned to the initial position.

To carry out quantitative analysis by means of the present device, recourse may be had to the following three techniques:

(a) Where chromatogram tracing does not involve the effusiometric determination of the molecular weight of components, the quantitative analysis technique consists in measuring the area under chromatographic peaks;

(b) where chromatogram tracing does not involve the effusiometric determination of the molecular weight of components, the quantitative analysis technique consists in integrating the chromatographic peaks by an integrator (in this instance, measurements are performed with switch 51 closed);

(c) where chromatogram tracing involves simultaneous effusiometric determination of the molecular weight, the quantitative analysis technique consists in interpreting the chromatogram traced on another detector, or obtained by rechromatographing but in the absence of effusion cell 1, or in measuring the area under a chromatographic peak that is "broken" for the effusiometric analysis (FIG. 5 or FIG. 8, top). To this end, the graphic procedure presented in FIG. 5 (bottom) or FIG. 8 (bottom) should be resorted to. Through point c should be drawn a straight line, which is a continuation of the contour of the left side of the peak, while the right side of the peak should be transposed along the t-axis until point d coincides with the straight line (the ultimate position of the right part of the peak is shown by the dotted line), followed by measuring the horizontally shaded area under the peak.

This procedure automatically makes correction for material losses during the effusiometric analysis, the correction being equivalent to the area shaded with inclined lines in FIG. 5 or FIG. 8. The procedure should, naturally, be regarded as an approximation since it does not account for complex transient processes at the entrance of effusion cell 1 during closing and opening of valve 4. However, it has been shown experimentally that in the quantitative estimation of the composition of mixtures by this technique the error does not exceed 2–3%, this value being within the experimental error range in the technique involving "broken" peaks.

In the course of measuring the molecular weight by the effusiometric technique, the conditions of gas efflux from effusion cell 1 are governed by the dimensions of and gas pressure within the cell. For the most part, the pressure in effusion cell 1 at the moment of closing valve 4 depends upon the stream of carrier gas in chromatographic column 3. At high flow rates of the carrier gas, the pressure in effusion cell 1 might be greater than that required for the Knudsen flow from the cell for a certain period of time after closing of valve 4. Under these conditions, the initial portion of the experimental curve that corresponds to a specified period of time after closing the valve of effusion cell 1 (the length of this portion is controlled by the molecular weight of the carrier gas and might be equal to several $\tau_0$ for light gases) may deviate somewhat from the curve derived from the law of effusion with reference to the compound of a given molecular weight. Deviations from the behaviour predicted by the law of effusion is attributed to the phenomenon of test component entrainment from effusion cell 1 by the carrier gas and also to secondary processes that occur in ion source 11 of the mass spectrometer when the pressure in the effusion cell and ion source is still high. It is, therefore, pertinent to exclude, while determining the molecular weight by the differential technique, from effusiometric curve interpretation the initial portion of the curve which equals several $\tau_0$ on the time scale. Where the molecular weight is determined by the integration technique, it is expedient to switch on the integrator not simultaneously with closing the valve of effusion cell 1, but with a time lag (the delay should equal several $\tau_0$) effected thanks to the selection of appropriately shaped cam 32 of programmer 25.

The present device incorporates capillary copper column 3 50 cm. long, the stationary phase in the column being filled with Apiezon-N. The cilumn is contained in a thermostat which makes it possible to maintain in the column the temperature in the 0 to 200° C. range.

Effusion cell 1 is either thermostatically controlled at a preset temperature in the 100–150° C. range, temperature fluctuations being not in excess of 0.3° C., or the temperature of the effusion cell is periodically measured by a special-purpose thermocouple, and temperature data thus obtained are used to make appropriate corrections in the molecular weight measurements in accordance with the Formula 5. The vacuum system of the present device is heated to a temperature of 200° C., so that it is practicable to analyze compounds of low vapor pressure. A permanent magnet 54 (FIG. 2) provides for adequate stability of mass spectrometer operation. In the mass spectrometer, use is made of Nier ion source 11, operated from an electron emission stabilizer 55, which likewise applies requisite potentials to the electrodes.

The present device has been employed for chromatographing diverse mixtures, the chromatographic procedure being carried out simultaneously with the determination of molecular weights of mixture components, which components are representative of various classes of compounds having the molecular weight in the 29 to 371 range. The results of measurements are presented in FIG. 11 (integration technique) and FIG. 12 (differential technique), wherein molecular weights (M) of the compounds being analyzed are plotted on the abscissa, and on the ordinate, the experimentally obtained values for the right-hand part of the Formula 18 (for the integration technique) or for the right-hand part of the Formula 6, where measurements are done by the differential technique.

Calculations have been made to ascertain the accuracy of molecular weight determinations of mixture components on the present device.

Where use is made of a recording instrument and measurement duration is selected adequately, the calculated relative error of measurements equals 0.1–0.5%.

Although the present invention has been described with reference to a preferred embodiment thereof, it will be readily understood by those skilled in the art that various alterations and modifications may be practised without deviating from the spirit and scope of the invention.

Such modifications and alterations shall be considered as falling within the spirit and scope of the present invention as disclosed hereinabove in the description and in the appended claims.

What is claimed is:

1. A device for analyzing a gas mixture, comprising a system including: a gas chromatographic column, in which a carrier gas transports the mixture to be separated into components; an effusion cell having an inlet connected to said column at the outlet thereof, said effusion cell having Knudsen flow conditions for a certain preset time interval when determining the molecular weight of the mixture components; a vacuum detector with recording instruments connected to said effusion cell for determining the relative proportion of the components in the mixture and their molecular weights and for recording the same; means for effecting instantaneous closing of the effusion cell inlet orifice when determining the molecular weight of the mixture component on effluence of the component from said effusion cell under the Knudsen flow conditions; said effusion cell having a volume capacity ensuring the obtaining of the effusion time constant under the Knudsen flow conditions, which will be materially smaller than the time width of the line of a corresponding mixture component on the chromatograph; and controller means for generating modified detector response traces from which may be determined the molecular weights of the components eluted from the column, said controller means including means for integrating the signals from said detector to produce said traces during effusiometric measurement.

2. A device according to claim 1 wherein said vacuum detector comprises a mass spectrometer and said controller means comprises a plurality of contacts and relays arranged in a preset program, profiled cams controlling said contacts and relays and means for rotating said cams.

3. A device as claimed in claim 1 wherein said means for integrating the signals includes a DC amplifier circuit containing an RC-network for the determination of the molecular weight of the mixture component by integration, and an ionization chamber with a radio-active electron source for compensating background current of the detector.

References Cited

UNITED STATES PATENTS

| | | | |
|---|---|---|---|
| 3,106,087 | 10/1963 | Kindred | 73—23.1 |
| 3,124,952 | 3/1964 | Johnson | 73—23.1 |
| 3,291,980 | 12/1966 | Coates | 73—23.1 |
| 3,405,549 | 10/1968 | Finley | 73—23.1 |

OTHER REFERENCES

"Use of Mass Spectrometer as a Detector and Analyzer for Effluents Emerging from High Temperature Gas Liquid Chromatography Columns," Ragnar Ryhage—Analytical Chemistry, vol. 36, No. 4, April, 1964.

"Free Molecular Flow in the Sample Inlet to the Mass Spectrometer," Paul D. Zemany, Journal of Applied Physics, vol. 23, No. 8, August 1952.

RICHARD C. QUEISSER, Primary Examiner

C. E. SNEE III, Assistant Examiner

U.S. Cl. X.R.

250—41.9